United States Patent
Kim et al.

(10) Patent No.: US 7,548,281 B2
(45) Date of Patent: Jun. 16, 2009

(54) DEMODULATOR CIRCUIT FOR DIGITAL TELEVISION AND DEMODULATION METHOD

(75) Inventors: Min-Ho Kim, Suwon-si (KR); Dong-Seog Han, Daegu Metropolitan (KR); Ki-Dong Kang, Anyang-si (KR); Hyung-Woo Kim, Daegu Metropolitan (KR); Beom-Kon Kim, Daegu Metropolitan (KR); Sung-Hun Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1214 days.

(21) Appl. No.: 10/762,527

(22) Filed: Jan. 23, 2004

(65) Prior Publication Data

US 2004/0261122 A1    Dec. 23, 2004

(30) Foreign Application Priority Data

Feb. 5, 2003 (KR) .................. 10-2003-0007156

(51) Int. Cl.
*H04N 5/455* (2006.01)
(52) U.S. Cl. .................. 348/726; 348/725; 348/731
(58) Field of Classification Search ......... 348/725–726, 348/731–733, 735–737, 426, 607; 725/131, 725/151; 375/240.09, 240.29, 321, 324–326, 375/344, 355
See application file for complete search history.

(56) References Cited

U.S. PATENT DOCUMENTS

| 6,067,329 | A  | * | 5/2000  | Kato et al. ............... 375/321 |
| 6,665,355 | B1 | * | 12/2003 | Chen et al. .............. 375/321 |
| 6,842,488 | B2 | * | 1/2005  | Oh .......................... 375/261 |
| 6,882,373 | B2 |   | 4/2005  | Hong et al. |
| 7,038,730 | B2 | * | 5/2006  | Markman et al. ........ 348/607 |
| 7,061,996 | B2 | * | 6/2006  | Kim ......................... 375/321 |

FOREIGN PATENT DOCUMENTS

JP    2001-086175    3/2001

OTHER PUBLICATIONS

Korean Office Action with translation dated Dec. 14, 2004.

* cited by examiner

*Primary Examiner*—Trang U Tran
(74) *Attorney, Agent, or Firm*—Harness, Dickey & Pierce, P.L.C.

(57) ABSTRACT

An apparatus may include a sort circuit for receiving first and second baseband signals, where the sort circuit shifting frequencies of the first and second baseband signals. The apparatus may also include a removal circuit for receiving the shifted first and second baseband signals and for combining the shifted first and second baseband signals to provide a frequency-modulated signal, and a symbol timing restoration circuit for measuring a timing error in related symbols of the frequency-modulated signal, for generating an address selection signal that is proportional to the timing error, in response to a carrier restoration signal, and for indicating restoration of the carrier.

15 Claims, 7 Drawing Sheets

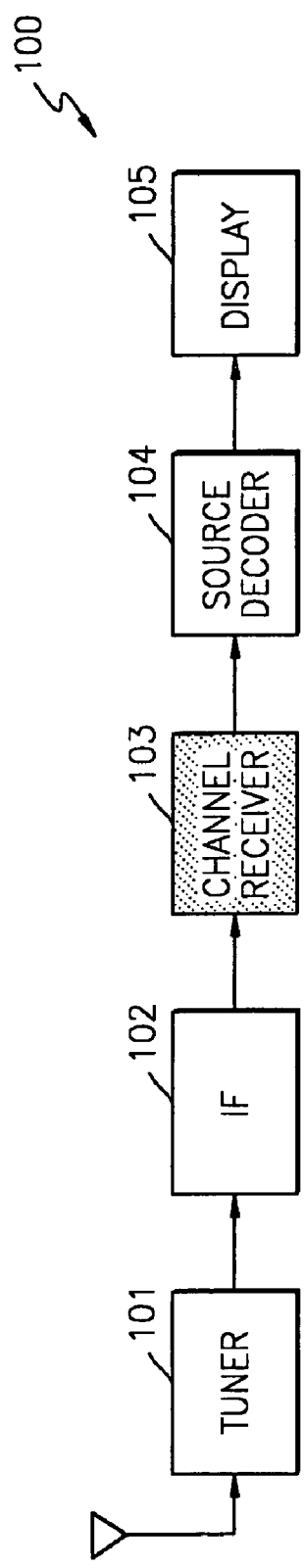
FIG. 1 (CONVENTIONAL)
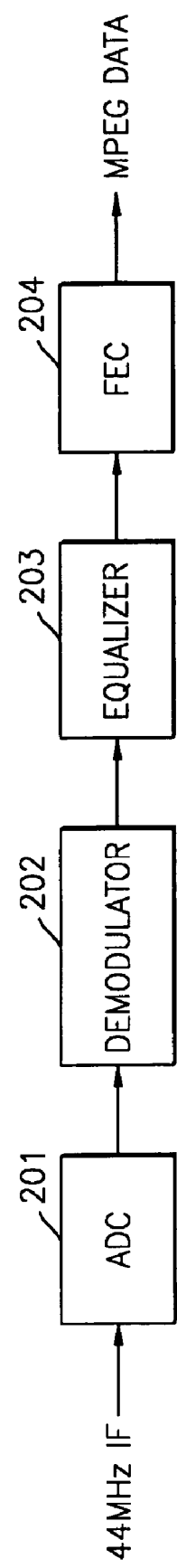
FIG. 2 (CONVENTIONAL)

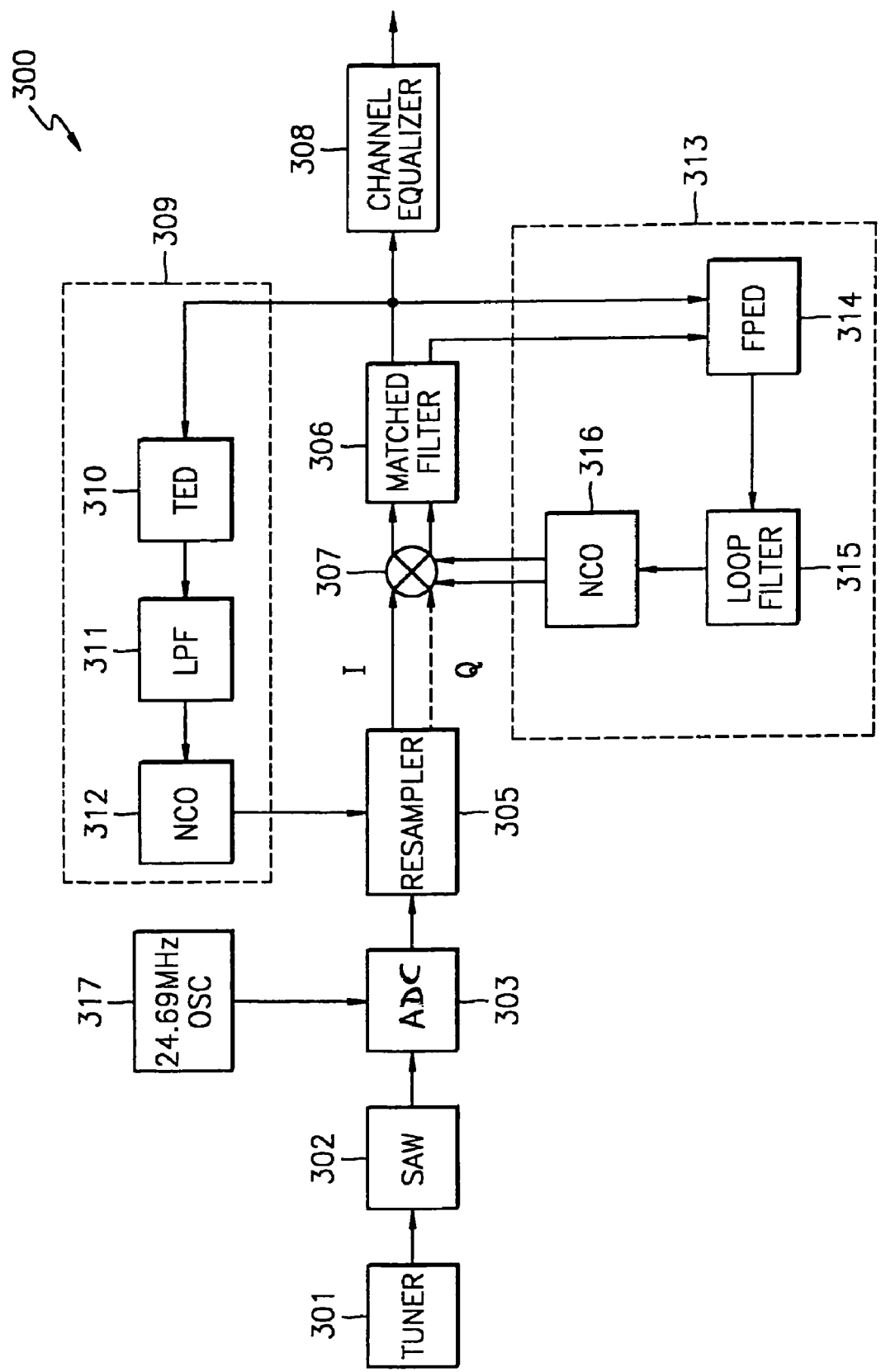
FIG. 3 (CONVENTIONAL)

DEMODULATOR CIRCUIT FOR DIGITAL TELEVISION AND DEMODULATION METHOD

This application claims priority from Korean Patent Application No. 10-2003-0007156, filed Feb. 5, 2003, in the Korean Intellectual Property Office (KIPO), the entire contents of which are hereby incorporated herein by reference.

BACKGROUND OF THE INVENTION

1. Field of the Invention

The present invention generally relates to a digital television receiver, and more particularly, to a demodulation circuit built in a digital television receiver capable of restoring a carrier and a symbol clock, and a demodulation method therefor.

2. Description of the Related Art

In general, due to noise, it is difficult to successfully perform frequency and symbol synchronization using a terrestrial receiving system with multiple paths. Therefore, current research is aimed at improving the receiving performance of terrestrial receiving systems. In particular, research shows that the receiving performance may be improved by increasing the performance of an equalizer. However, prior to improving the equalizer performance, a received signal should be initially demodulated and synchronized with a symbol clock.

FIG. 1 is a block diagram illustrating a conventional digital television receiving system 100. Referring to FIG. 1, when a digital broadcast signal is input to a tuner 101 via an antenna, the tuner 101 selects a desired channel frequency. A signal output from the tuner 101 passes through an intermediate frequency (IF) converter 102. The IF converter 102 generates a signal in an IF band.

The signal output from the IF converter 102, which is output at 44 MHz, is then input to a channel receiver 103 and quantized by direct sampling. Then, the quantized signal passes through a source decoder 104, is input to a display 105, and displayed on a screen.

FIG. 2 is a block diagram illustrating the structure of a channel receiver as shown in FIG. 1. The channel receiver 200 includes an analog-to-digital converter (ADC) 201, a demodulator 202, an equalizer 203, and a forward error corrector (FEC) 204.

The ADC 201 quantizes an IF signal and the demodulator 202 performs timing and frequency synchronization for synchronization of received data.

FIG. 3 is a block diagram illustrating a conventional digital television receiver 300. Referring to FIG. 3, the digital television receiver 300 includes a tuner 301, an SAW filter 302, an ADC 303, a resampler 305, a matched filter 306, a multiplier 307, a timing restoration unit 309, a carrier restoration unit 313, and a channel equalizer 308.

Referring to FIG. 3, when a signal is input to the tuner 301 via an antenna (not shown), the tuner 301 selects a channel frequency and lowers a radio frequency (RF) band of the channel frequency to a fixed IF band. The SAW filter 302 removes all frequency bands, except for a frequency band that carries information, of the signal output from the tuner 301, and outputs the signal at the frequency band to the ADC 303.

The ADC 303 converts the signal output from the SAW filter 302 into a digital signal by sampling the signal at a fixed frequency of 24.69 MHz and outputs the digital signal to the resampler 305 for restoration of a digital symbol clock.

The resampler 305 receives timing errors of symbols, which are obtained from baseband symbol processing, from the timing restoration unit 309 and performs interpolation to reduce an error between the digital signals. As a result of the interpolation, the digital signal sampled at a frequency of 24.69 MHz passes through the resampler 305, and then, the symbol rate of the digital signal is interpolated from n points of the original symbol rate.

The signal output of the resampler 305 is input to the multiplier 307, and the baseband digital signal output from the multiplier 307 passes through the matched filter 306 and is sequentially input to the timing restoration unit 309, the carrier restoration unit 313, and the channel equalizer 308.

The carrier restoration unit 313 removes a carrier frequency offset and phase noise from the baseband digital signal output from the multiplier 307 and feeds a complex sinewave, as the result of removal, back to the multiplier 307.

The timing restoration unit 309 extracts information regarding timing errors from the baseband digital signal output from the multiplier 307 and adjusts the sampling timing of the resamplier 305 based on the extracted information.

The conventional television receiver normally requires a demodulation system to adjust the rate of an error in a received signal caused by the multiple paths of the television receiver. The demodulation system also normally performs frequency synchronization even if a frequency error is large.

SUMMARY OF THE INVENTION

An exemplary embodiment of the present invention may provide a digital demodulator capable of adjusting the rate of an error in a received signal caused in multiple paths of a receiving system and performing frequency synchronization even if a frequency error is large.

An exemplary embodiment of the present invention may also provide a demodulation method for effectively adjusting the rate of an error in a received signal caused in multiple paths of a receiving system and performing frequency synchronization even if a frequency error is large.

According to an exemplary embodiment of the present invention, there is provided a demodulation circuit for a digital television receiving system. The circuit may include a polyphase filter for converting a data rate of a digital intermediate frequency signal into a desired data rate of the digital intermediate frequency signal in response to an address selection signal, and for dividing and outputting the digital intermediate frequency signal into a first signal having a real number component and a second signal having an imaginary number component; a complex multiplication unit for multiplying the first and second signals by a complex sinewave obtained from a restored carrier so as to remove frequency offsets from the first and second signals, and for generating a first baseband signal and a second baseband signal as the result of removing the frequency offsets; a carrier restoration circuit for detecting the frequency offset of the carrier from the first and second baseband signals and for generating the complex sinewave that is proportional to the frequency offset; a matched filter for filtering the first and second baseband signals to control signal-to-noise ratios thereof; a sort circuit for shifting the frequencies of outputs from the matched filter; a direct current removal circuit that combines the outputs of the sort circuit and removes a direct current component from the result of combination; a sampling rate control circuit for changing the sampling rate of an output of the DC removal circuit and for outputting the result; and a symbol timing restoration circuit for measuring a timing error in related symbols of the output of the DC removal circuit and for generating the address selection signal that is proportional to the timing error, in response to a carrier restoration signal that is generated by the carrier restoration circuit and for indicating restoration of the carrier.

According to yet another exemplary embodiment of the present invention, provided is a method of demodulating a received signal. The method may include converting a data rate of a digital intermediate frequency (IF) signal into a desired data rate of the intermediate frequency signal in response to an address selection signal; dividing and outputting the digital IF signal into a first signal with a real number component and a second signal with an imaginary number component; multiplying the first and second signals by a complex sinewave obtained from a carrier so as to remove frequency offsets from the first and second signals and generating a first baseband signal and a second baseband signal as the result of removing the frequency offsets; receiving the first and second baseband signals, controlling their SNRs, and shifting the frequency bands of the SNR-controlled first and second baseband signals; combining the frequency-shifted first and second baseband signals and removing a DC component from a signal obtained therefrom; changing and outputting the sampling rate of the signal obtained in the combining step; receiving the first and second baseband signals, detecting the frequency offset from the carrier, and generating the complex sinewave that is proportional to the frequency offset; and receiving the signal obtained in the combining step and generating the address selection signal, in response to a carrier restoration signal that indicates restoration of the carrier.

BRIEF DESCRIPTION OF THE DRAWINGS

Exemplary embodiments of the present invention will become more fully understood from the detailed description given hereinbelow and the accompanying drawings which are given by way of illustration only, and thus are not limitative of the present invention, and wherein:

FIG. 1 is a block diagram illustrating the structure of a conventional receiving system built in a digital television system;

FIG. 2 is a block diagram illustrating the structure of the conventional channel receiver of FIG. 1;

FIG. 3 is a block diagram illustrating the structure of a conventional digital television receiver;

DETAILED DESCRIPTION OF THE INVENTION

Figure 4:
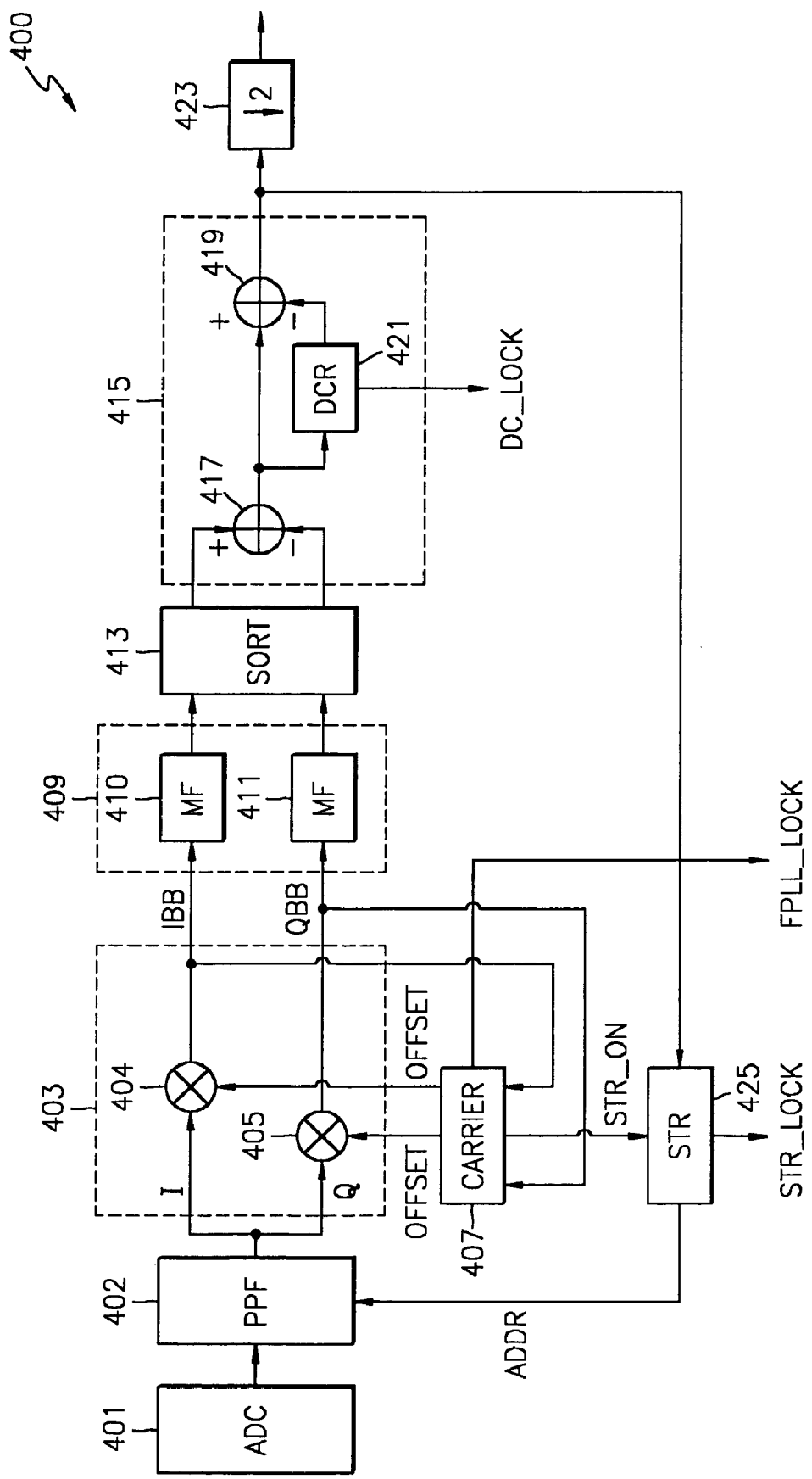
FIG. 4 is a block diagram illustrating the structure of a demodulation circuit for a digital television receiving system, according to an exemplary embodiment of the present invention.

Hereinafter, exemplary embodiments of the present invention will be described in detail with reference the accompanying drawings. The same reference numerals represent the same elements throughout the drawings.

FIG. 4 is a block diagram illustrating the structure of a demodulation circuit 400 included in a digital television receiving system, according to an exemplary embodiment of the present invention. Referring to FIG. 4, the demodulation circuit 400 may include a polyphase filter (PPF) 402, a complex multiplication unit 403, a carrier restoration circuit 407, a matched filter unit 409, a sort circuit 413, a DC removal circuit 415, a sampling rate control circuit 423, and a symbol timing restoration (STR) circuit 425.

The PPF 402 is capable of changing a data rate of a digital intermediate frequency (IF) signal into a desired data rate of the digital intermediate frequency signal in response to an address selection signal ADDR, and may divide and output the digital IF signal into two signals: a first signal I with a real number component and a second signal Q with an imaginary number component.

More specifically, the ADC 401 is capable of sampling an input signal and outputting the sampled signal to the PPF 402. Then, the PPF 402 may interpolate the received signal so as to change the data rate of this signal to a desired data rate. For instance, the ADC 401 samples the input signal at a frequency of 24.60 MHz and the PPF 402 converts the data rate of the signal output from the ADC 401 into a data rate at a frequency of 21.52 MHz. The signal having the desired data rate may be divided into the first signal with the real number component and the second signal with the imaginary number component. Here, the first signal is an in-phase (I) signal and the second signal is a quadrature-phase (Q) signal.

The complex multiplication unit 403 is capable of multiplying the first signal I and the second signal Q by a complex sinewave OFFSET obtained from a restored carrier, in order to remove frequency offsets from the first signal I and the second signal Q. Then, the complex multiplication unit 403 may generate a first baseband signal IBB and a second baseband signal QBB. The complex multiplication unit 403 includes two multipliers 404 and 405.

The complex sinewave OFFSET may be generated by the carrier restoration circuit 407. The constitution and operations of carrier restoration circuit 407 will be described later.

The first and second baseband signals IBB and QBB may be input to the matched filter unit 409, and the matched filter unit 409 is capable of filtering the first and second baseband signals IBB and QBB and may control any signal-to-noise ratios (SNRs) of these signals.

The SNRs of the first and second baseband signals IBB and QBB may be brought to a near maximum level by filtering these signals using the matched filter unit 409. The matched filter unit 409 may include two matched filters 410 and 411.

Although both the complex multiplication unit 403 and the matched filter unit 409 are each illustrated and described as having discrete elements, this is done by way of example only. In particular, the complex multiplication unit 403 and the matched filter unit 409 may also be realized using other circuitry as that illustrated and described herein.

The sort circuit 413 can shift the frequencies of the first and second baseband signals IBB and QBB output from the matched filter unit 409. In exemplary embodiment of the present invention, the sort circuit 413 is capable of lowering the frequencies of the first and second baseband signals IBB and QBB output from the matched filter unit 409.

The first and second baseband signals IBB and QBB that are output from the sort circuit 413 and the frequencies of which are lowered, are combined to obtain a frequency-modulated signal, and a DC component may be removed from the frequency-modulated signal. Next, the sampling rate of the frequency-modulated signal from which the DC component is removed may be reduced to a half and the signal is output.

The combination of signals, the removal of the DC component, and the reducing of the sampling rate may be performed by the DC removal circuit 415 and the sampling rate control circuit 423.

The DC removal circuit 415 is capable of combining the signals output from the sort circuit 413 and removing a DC component therefrom.

More specifically, the DC removal circuit 415 may include a first subtracter 417, a DC component restoration (DCR) circuit 421, and a second subtracter 419. The first subtracter 417 may subtract the second baseband signal QBB, whose frequency is shifted by the sort circuit 413, from the first baseband signal IBB, whose frequency is also shifted by the sort circuit 413.

The first subtracter 417 may be an adder. The value of the frequency-shifted second baseband signal QBB may be converted into a negative (−) value and combined with the frequency-shifted first baseband signal IBB in the first subtracter 417. As a result, a subtraction operation may be performed by the first subtracter 417.

The DCR circuit 421 is capable of detecting a DC component from an output of the first subtracter 417. The second subtracter 419 may subtract an output of the DCR circuit 421 from the output of the first subtracter 417.

The sampling rate control circuit 423 may change the sampling rate of a signal output from the DC removal circuit 415 and is capable of outputting the sampling rate changed signal. In particular, the sampling rate control circuit 423 may reduce the sampling rate of the signal output from the DC removal circuit 415 by a half.

Therefore, in the demodulation circuit 400 according to an exemplary embodiment of the present invention, frequency synchronization may be performed by the carrier restoration circuit 407 and symbol-timing restoration may be performed by the STR circuit 425.

Figure 5:
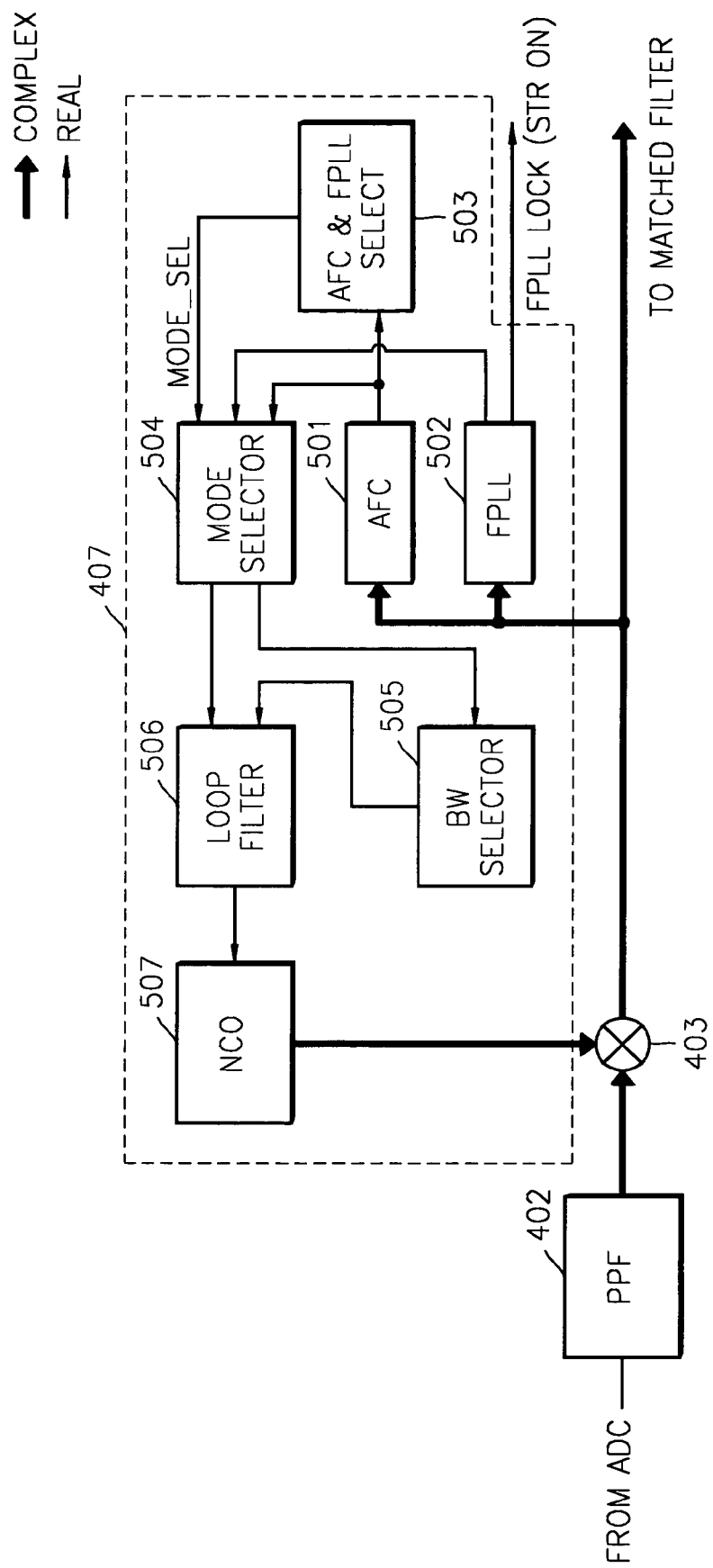
FIG. 5 is a block diagram illustrating the structure of a carrier restoration circuit of FIG. 4.

FIG. 5 is a block diagram illustrating the structure of the carrier restoration circuit 407 shown in FIG. 4. The carrier restoration circuit 407 is capable of detecting a frequency offset of a carrier from the first and second baseband signals IBB and QBB shown in FIG. 4 and may generate a complex sinewave OFFSET proportional to the frequency offset.

When a signal is input to a digital television receiver, frequency offset and phase noise are generated at a frequency of several hundred KHz in a tuner or a radio-frequency (RF) oscillator. For accurate restoration of data, the generation of frequency offset and phase noise generally should be minimized. Acquisition or tracking of a carrier to minimize generation of a frequency offset and phase noise is typically called restoration of a carrier.

The carrier restoration circuit 407 is capable of removing a frequency offset and phase noise from a carrier from the first and second baseband signals IBB and QBB output from the complex multiplication unit 403, and may feed a complex sinewave OFFSET, as the result of removing operation, back to the complex multiplication unit 403. Next, the complex multiplication unit 403 may output a baseband signal whose frequency offset and phase noise are reduced to the matched filter unit 409.

A signal output from a numerically controlled oscillator (NCO) 507 and a signal output from the PPF 402 pass through the complex multiplication unit 403 to be multiplied by each other. A signal obtained from the result of multiplication may be input to an auto frequency control (AFC) 501 and a frequency phase lock loop (FPLL) 502.

The AFC 501 and the FPLL 502 may detect and output an error component from the input signal. An AFC & FPLL selector 503 may output a mode selection signal MODE_SEL to a mode selector 504, and the mode selector 504 may select one of an output of the AFC 501 and an output of the FPLL 502 in response to the mode selection signal MODE_SEL.

The mode selector 504 is capable of controlling a bandwidth (BW) selector 505 and outputting error data to a loop filter 506. Then, the loop filter 506 may add up the error data and outputs the result of addition to the NCO 507.

The NCO 507 is capable of generating the complex sinewave OFFSET that is proportional to the output of the loop filter 506 and used to remove the frequency offset from the input signal, and may output it to the complex multiplication unit 403. The complex sinewave OFFSET is multiplied by the output of the PPF 402 and the result of multiplication is a signal from which a frequency error and phase noise may be removed. This signal is input to the matched filter unit 409.

Figure 6:
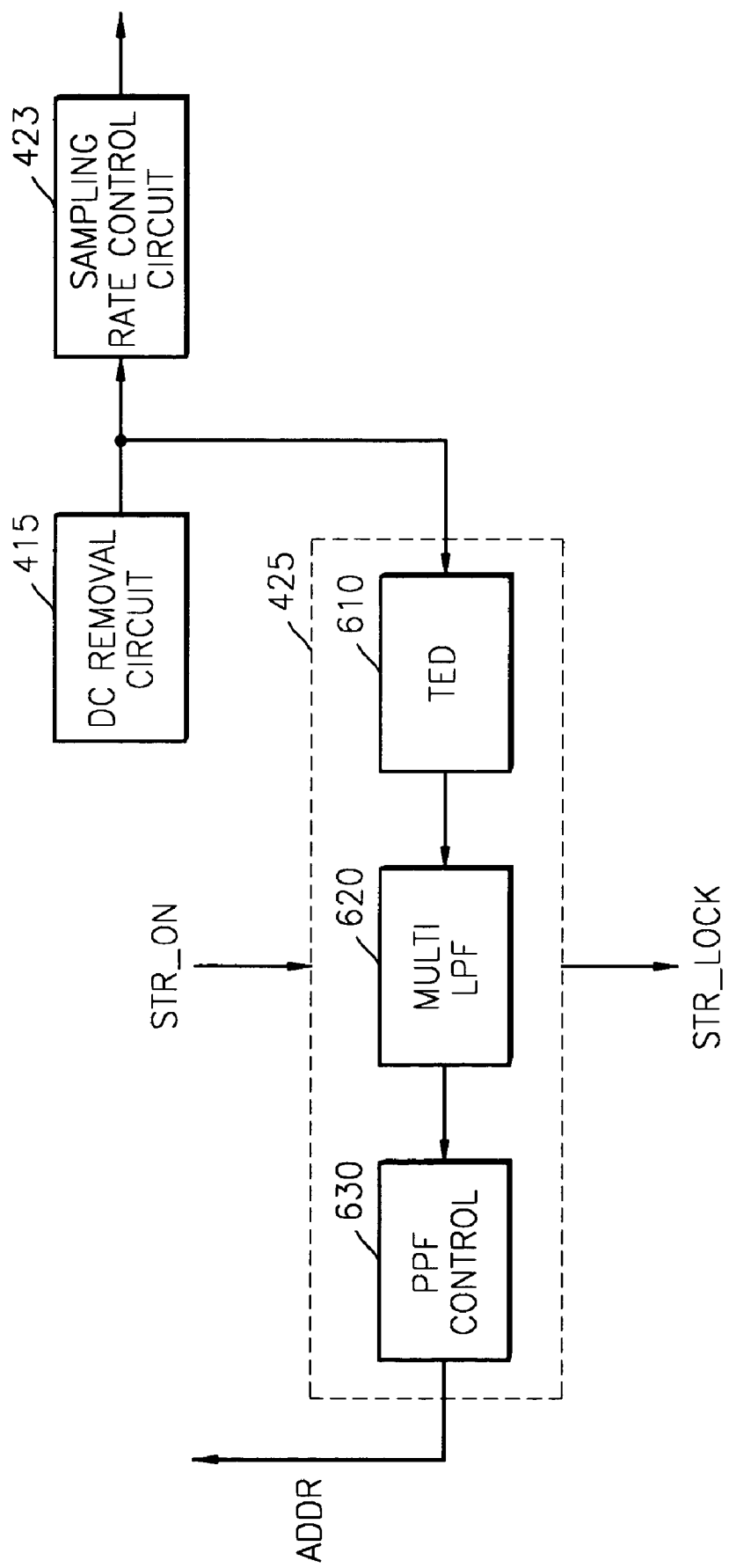
FIG. 6 is a block diagram illustrating the structure of a symbol timing restoration circuit of FIG. 4.

FIG. 6 is a block diagram illustrating the structure of the symbol timing restoration (STR) circuit 425 of FIG. 4. To restore transmitted data in a digital television receiver, the STR circuit 425 may generate the same symbol clock as a symbol clock used during transmission of data, since normally only data is contained in a signal that is to be transmitted in the Advanced Television Systems Committee (ATSC) VSB Transmission System adopting the U.S. digital television system.

The STR circuit 425 according to an exemplary embodiment of the present invention may measure a timing error of related symbols using the output of the DC removal circuit 415 and may generate the address selection signal ADDR that is proportional to the timing error, in response to a carrier restoration signal STR_ON that is generated by the carrier restoration circuit 407 and indicates restoration of the carrier.

The STR circuit 425 may include a timing error detector (TED) 610, a multi-low pass filter (LPF) 620, and a polyphase filter (PPF) control 630.

The TED 610 may detect a timing error from an output of the DC removal circuit 415 and may output the detected timing error to the multi LPF 620. The multi LPF 620 may be used to remove a high frequency component from the timing error output from the TED 610. The multi LPF 620 may be used to remove the high frequency component from the timing error by changing the bandwidth of the multi LPF 620.

For instance, the multi LPF 620 can expedite symbol synchronization by changing the bandwidth of the multi LPF 620 from a wide band to a middle band and then to a narrow band. If the bandwidth of the multi LPF 620 gradually changes from the wide band to the narrow band, the convergence of the timing error may be increased, as is illustrated in FIGS. 7A and 7B.

Figure 7A:
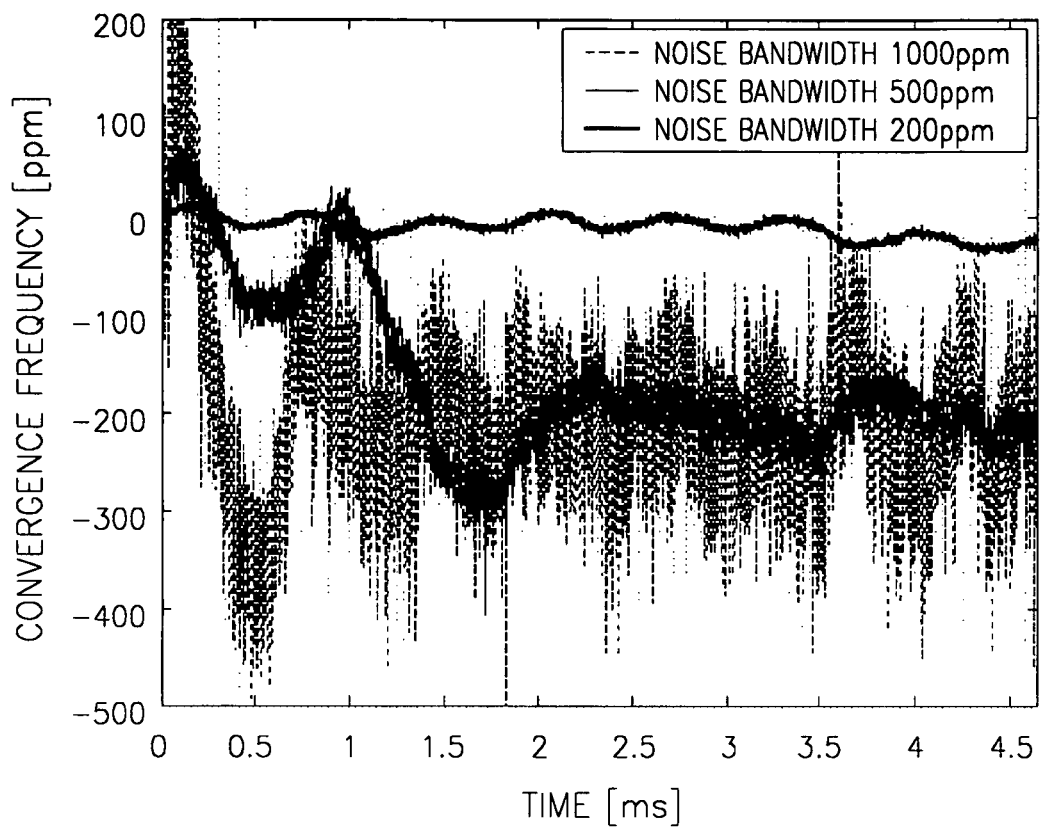
FIG. 7A is a graph illustrating waveforms of a signal from which a high frequency component of an error is removed while fixing a frequency bandwidth of a multi-low pass filter (LPF) of FIG. 6.

FIG. 7A illustrates the waveforms of a signal from which a high frequency component in a timing error is removed while maintaining the bandwidth of the PPF 402 to a predetermined level. FIG. 7B illustrates the waveforms of a signal from which a high frequency component in a timing error is removed while changing the bandwidth of the PPF 402.

Figure 7B:
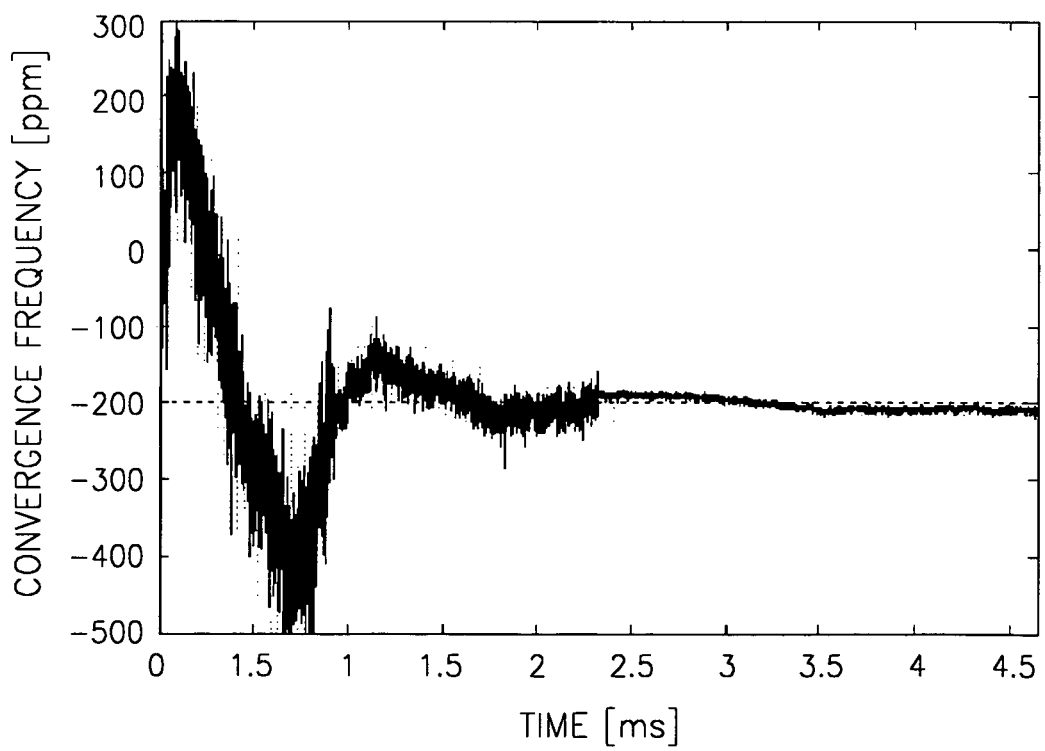
FIG. 7B is a graph illustrating the waveforms of a signal from which a high frequency component of an error is removed while varying a frequency bandwidth of a multi-low pass filter (LPF) of FIG. 6.

In FIG. 7B, the high frequency component may be removed by initially setting the filter bandwidth to a wide band so as to expedite symbol synchronization and then tapering the filter bandwidth gradually. In this way, the occurrence of a jitter can also be reduced. The removal of the high frequency component shown in FIG. 7B may accelerate symbol synchronization and reduce generation of noise.

The PPF control 630 may receive the output of the multi LPF 620 and may output an address selection signal ADDR. The address selection signal ADDR may be an n-bit signal that controls the operation of the PPF 402 to adjust the data rate of an input signal input to the PPF 402.

Figure 8:
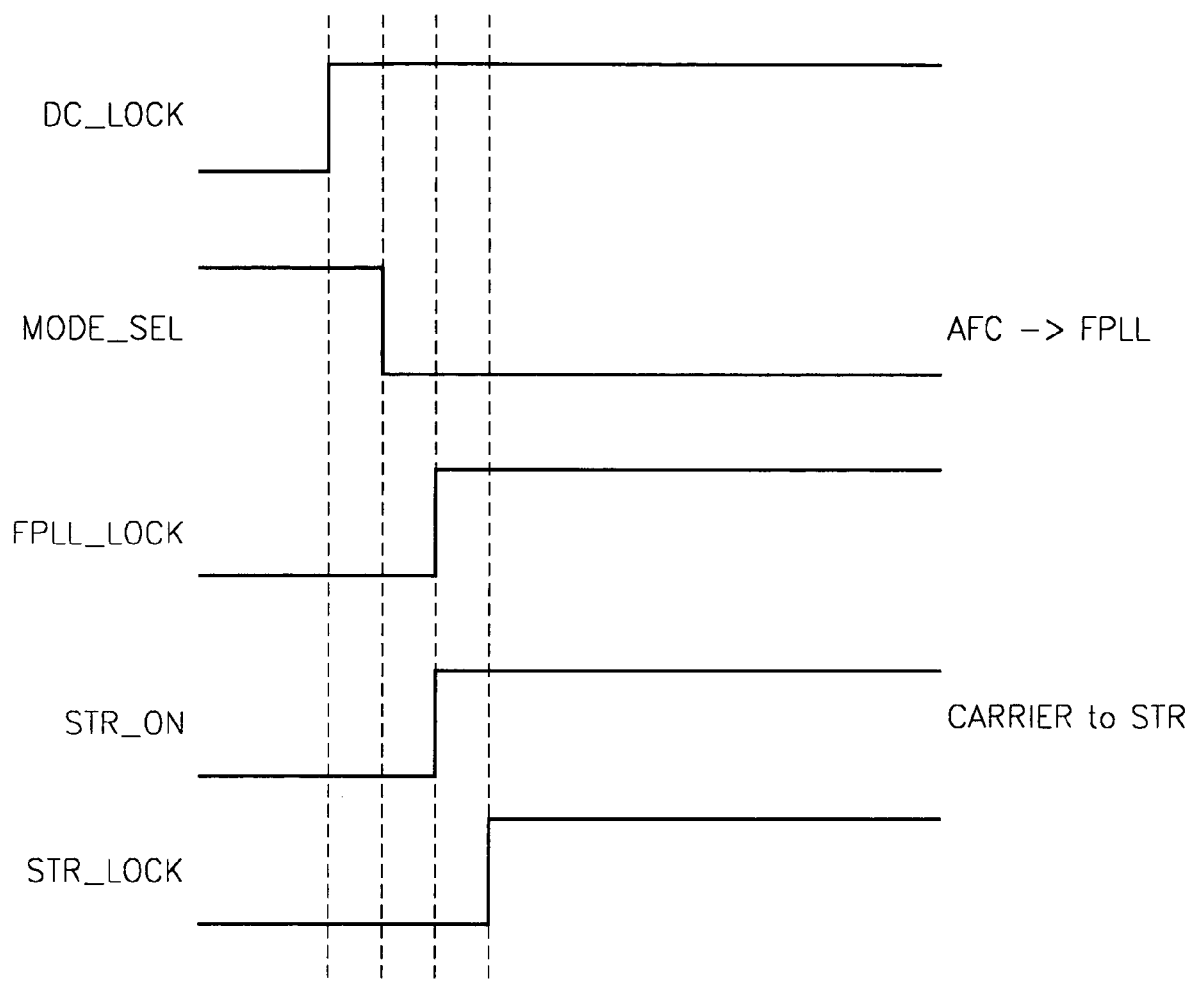
FIG. 8 is a timing diagram illustrating the operation of the demodulation circuit of FIG. 4.

FIG. 8 is a timing diagram illustrating the operation of a demodulation circuit according to an exemplary embodiment of the present invention. The overall operations of the demodulation circuit will now be described using the demodulation circuit 400 shown in FIG. 4 with reference to FIG. 8.

The demodulation circuit 400 is characterized in that symbol synchronization is performed using the STR circuit 425 after restoration of a carrier by the carrier restoration circuit 407.

In the demodulation circuit 400, a DC component removal signal DC_LOCK, which indicates removal of a DC component by the DC removal circuit 415, may be first generated by the DC removal circuit 415. Next, a mode selection signal MODE_SEL may be generated. The mode selection signal MODE_SEL is normally a signal that changes an operation mode of the AFC 501 into an operation mode of the FPLL 502 during restoration of a carrier by the carrier restoration circuit 407.

After the generation of mode selection signal MODE_SEL, a carrier restoration circuit operation signal FPLL_LOCK that indicates the operation of the carrier restoration circuit 407 may be generated. At the same time, a carrier restoration signal STR_ON that operates the STR circuit 425 may be generated.

In summary, the DC component may be removed by the DC removal circuit 415, and then, the carrier restoration circuit 407 starts the carrier restoration. After the carrier restoration, the STR circuit 425 starts symbol synchronization. Therefore, if the symbol synchronization ends, it can be understood that the carrier restoration and the symbol synchronization are substanitally completed.

A method of demodulating a received signal according to an exemplary embodiment of the present invention may include: (a) changing the data rate of a digital intermediate frequency (IF) signal into a desired data rate in response to an address selection signal, and dividing and outputting the digital IF signal into a first signal with a real number component and a second signal with an imaginary number component; (b) multiplying the first and second signals by a complex sinewave obtained from restoration of a carrier so as to remove frequency offsets from the first and second signals, and generating first and second baseband signals as the result of removal; (c) receiving the first and second baseband signals, controlling their signal-to-noise ratios (SNRs), and shifting the frequency bands of the first and second baseband signals; (d) combining the frequency-shifted first baseband signals and the frequency-shifted second baseband signals and removing a DC component from a signal obtained from the result of combination; (e) changing the sampling rate of the signal obtained from the result of combination and outputs the signal; (f) receiving the first and second baseband signals, detecting a frequency offset of a carrier from the received signals, and generating the complex sinewave in proportion to the frequency offset; and (g) receiving the signal that is obtained from the result of combination and from which the DC component is removed and generating the address selection signal, in response to a carrier restoration signal indicating restoration of the carrier.

The method of demodulating a received signal according to an exemplary embodiment of the present invention corresponds to the aforementioned operation of the demodulation circuit 400.

As described above, a demodulation circuit for a digital television receiving system and a method of demodulating a received signal, according to an exemplary embodiment of the present invention, may use a polyphase filter (PPF), i.e., an interpolator, to successfully demodulate a received signal. Also, it is possible to accelerate frequency synchronization and reduce noise even if a frequency error is large.

While exemplary embodiments of the present invention have been particularly shown and described herein, it is understood by those skilled in the art that various changes in form and details may be made without departing from the spirit and scope of the present invention as set forth by the claims.

What is claimed is:

1. A demodulation circuit for a digital television receiving system, comprising:
   a polyphase filter for converting a data rate of a digital intermediate frequency signal into a desired data rate of the digital intermediate frequency signal in response to an address selection signal, and for dividing and outputting the digital intermediate frequency signal into a first signal having a real number component and a second signal having an imaginary number component;
   a complex multiplication unit for multiplying the first and second signals by a complex sinewave obtained from a restored carrier so as to remove frequency offsets from the first and second signals, and for generating a first baseband signal and a second baseband signal as a result of removing the frequency offsets;
   a carrier restoration circuit for detecting the frequency offsets of the carrier from the first and second baseband signals and for generating the complex sinewave that is proportional to the frequency offsets;
   a matched filter for filtering the first and second baseband signals to control signal-to-noise ratios thereof;
   a sort circuit for shifting frequencies of outputs from the matched filter;
   a direct current (DC) removal circuit that combines outputs of the sort circuit and removes a direct current component from a result of the combination;
   a sampling rate control circuit for changing a sampling rate of an output of the DC removal circuit and for outputting the result; and
   a symbol timing restoration (STR) circuit for measuring a timing error in related symbols of the output of the DC removal circuit and for generating the address selection signal that is proportional to the timing error, in response to a carrier restoration signal that is generated by the carrier restoration circuit and for indicating restoration of the carrier.

2. The demodulation circuit of claim 1, wherein the sort circuit lowers the frequency of the outputs from the matched filter.

3. The demodulation circuit of claim 1, wherein the DC removal circuit comprises:
   a first subtracter for subtracting the second baseband signal, the second baseband signal having a frequency shifted by the sort circuit, from the first baseband signal, the first baseband signal also having a frequency shifted by the sort circuit;
   a DC component restoration circuit for detecting a DC component from an output of the first subtracter; and
   a second subtracter for subtracting an output of the DC component restoration circuit from the output of the first subtracter.

4. The demodulation circuit of claim 1, wherein the sampling rate control circuit reduces the sampling rate of the output of the DC removal circuit by at least a half.

5. The demodulation circuit of claim 1, wherein the STR circuit comprises:
- a timing error detector for detecting the timing error of the output of the DC removal circuit;
- a multi low pass filter (LPF) for removing a high frequency component from the timing error output from the timing error detector; and
- a polyphase filter (PPF) controller for receiving an output of the multi LPF and for outputting the address selection signal, in response to the carrier restoration signal.

6. The demodulation circuit of claim 5, wherein the multi LPF removes the high frequency component of the timing error by changing the bandwidth of the multi LPF.

7. The demodulation circuit of claim 1, wherein symbol synchronization is performed by the STR circuit after restoration of the carrier by the carrier restoration circuit.

8. The demodulation circuit of claim 1, wherein the first signal is an in-phase (I) signal and the second signal is a quadrature-phase (Q) signal.

9. A method of demodulating a received signal, comprising:
- converting, in a first filter, a data rate, of a digital intermediate frequency (IF) signal into a desired data rate of the intermediate frequency signal in response to an address selection signal;
- dividing and outputting, in the first filter, the digital IF, signal into a first signal with a real number component and a second signal with an imaginary number component;
- multiplying, in a multiplier, the first, and second signals by a complex sinewave obtained from a carrier so as to remove frequency offsets from the first and second signals and generating, in the multiplier, a first baseband, signal and a second baseband signal as a result of removing the frequency offsets;
- receiving, in a second filter, the first, and second baseband signals, controlling, in the second filter, signal-to-noise ratios (SNRs) of the first and second basebands signals, and shifting, in a sorter, frequency bands, of the SNR-controlled first and second baseband signals;
- combining, in a remover, the frequency-shifted, first and second baseband signals and removing, in the remover, a direct-current (DC), component from a signal obtained therefrom;
- changing and outputting, in a controller, a sampling rate, of the signal obtained in the combining step;
- receiving, in a first restorer, the first and second, baseband signals, detecting, in the first restorer, frequency offsets from the carrier, and generating, in the first restorer, the complex sinewave, that is proportional to the frequency offsets; and
- receiving, in a second restorer, the signal obtained in the combining step and generating, in the second restorer, the address selection signal, in response to a carrier restoration signal that indicates restoration of the carrier.

10. The method of claim 9, wherein receiving the first and second baseband signals further includes lowering the frequency bands of the controlled first and second baseband signals.

11. The method of claim 9, wherein the combining step further includes:
- subtracting the frequency-shifted second baseband signal from the frequency-shifted first baseband signal;
- detecting the DC component from a result of the subtraction; and
- subtracting the result of the detection from the result of the subtraction.

12. The method of claim 9, wherein the step of changing and outputting includes reducing by half the sampling rate of the signal obtained in the combining step.

13. The method of claim 9, wherein the step of receiving the signal further includes:
- receiving the signal obtained in the combining step and detecting a timing error from the received signal;
- removing a high frequency component from the timing error obtained in the receiving step hereof using a multi low pass filter (LPF); and
- receiving a result obtained in removing step hereof and outputting the address selection signal, in response to the carrier restoration signal.

14. The method of claim 13, wherein the multi LPF removes the high frequency component from the timing error by changing a bandwidth of the multi LPF.

15. The method of claim 9, wherein the first signal is an in-phase (I) signal and the second signal is a quadrature-phase (Q) signal.

* * * * *